US011335188B2

(12) United States Patent
Gigengack et al.

(10) Patent No.: US 11,335,188 B2
(45) Date of Patent: May 17, 2022

(54) METHOD FOR AUTOMATICALLY PRODUCING AND UPDATING A DATA SET FOR AN AUTONOMOUS VEHICLE

(71) Applicant: Robert Bosch GmbH, Stuttgart (DE)

(72) Inventors: Fabian Gigengack, Hannover (DE); Hanno Homann, Hannover (DE); Max Schneider, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 377 days.

(21) Appl. No.: 16/605,966

(22) PCT Filed: Mar. 23, 2018

(86) PCT No.: PCT/EP2018/057463
§ 371 (c)(1),
(2) Date: Oct. 17, 2019

(87) PCT Pub. No.: WO2018/197122
PCT Pub. Date: Nov. 1, 2018

(65) Prior Publication Data
US 2020/0126408 A1 Apr. 23, 2020

(30) Foreign Application Priority Data
Apr. 24, 2017 (DE) .......................... 102017206847.7

(51) Int. Cl.
G08G 1/01 (2006.01)
B60W 30/12 (2020.01)
(Continued)

(52) U.S. Cl.
CPC ........... G08G 1/0129 (2013.01); B60W 30/12 (2013.01); G05D 1/0088 (2013.01); G06V 20/56 (2022.01);
(Continued)

(58) Field of Classification Search
CPC .. G08G 1/0129; G08G 1/0112; G08G 1/0133; B60W 30/12; G05D 1/0088; G05D 2201/0213; G06K 9/00791
See application file for complete search history.

(56) References Cited

U.S. PATENT DOCUMENTS 9,299,251 B2 * 3/2016 Scofield ............... G08G 1/0104
9,435,654 B2 * 9/2016 Ibrahim ................. G01C 21/10
(Continued)

FOREIGN PATENT DOCUMENTS

CN 101033598 A 9/2007
CN 102117546 A 7/2011
(Continued)

OTHER PUBLICATIONS

International Search Report for PCT/EP2018/057463, dated Jun. 14, 2018.
(Continued)

Primary Examiner — Frederick M Brushaber
(74) Attorney, Agent, or Firm — Norton Rose Fulbright US LLP; Gerard Messina

(57) ABSTRACT

A method for the automatic production and updating of a data set for an autonomous vehicle, in which at least one traffic light and a switching state of the at least one traffic light are registered; at least one road marking is ascertained; a trajectory of at least one vehicle traveling ahead is registered; and the collected data are used for producing and updating a data set, and based on the at least one detected trajectory, the at least one switching state of the at least one traffic light and the at least one ascertained road marking, at least one traffic lane is allocated to at least one traffic light. In addition, an autonomous or partially autonomous vehicle is described for carrying out the method.

11 Claims, 3 Drawing Sheets

(51) Int. Cl.
*G05D 1/00* (2006.01)
*G06V 20/56* (2022.01)
*G01C 21/00* (2006.01)
*G01S 17/88* (2006.01)
*G06V 20/58* (2022.01)
*G08G 1/04* (2006.01)

(52) U.S. Cl.
CPC ......... *G08G 1/0112* (2013.01); *G08G 1/0133* (2013.01); *G05D 2201/0213* (2013.01)

(56) References Cited

U.S. PATENT DOCUMENTS

| | | | |
|---|---|---|---|
| 9,672,734 B1* | 6/2017 | Ratnasingam | H04W 4/44 |
| 2009/0290869 A1 | 11/2009 | Aono | |
| 2018/0286227 A1* | 10/2018 | Sorgatz | G08G 1/096725 |

FOREIGN PATENT DOCUMENTS

| | | |
|---|---|---|
| CN | 106327897 A | 1/2017 |
| CN | 106537480 A | 3/2017 |
| DE | 102014200638 A1 | 7/2015 |
| DE | 102015206593 A1 | 10/2016 |
| EP | 2486556 A1 | 8/2012 |
| EP | 3154043 A1 | 4/2017 |
| WO | 2015055185 A1 | 4/2015 |

OTHER PUBLICATIONS

Christian Ruhhammer et al., "Automated Intersecti on Mappi ng From Crowd Trajectory Data", IEEE Transactions on Intelligent Transportation Systems, vol. 18, No. 3, 2017, pp. 666-677, XP55481047.
Ruhhammer Christian et al., "Crowdsourced intersection parameters: A generic approach for extraction and confidence estimation", 2814 IEEE Intelligent Vehicles Symposium Proceedings, 2014, pp. 581-587, XP0326282721.

\* cited by examiner

METHOD FOR AUTOMATICALLY PRODUCING AND UPDATING A DATA SET FOR AN AUTONOMOUS VEHICLE

FIELD OF THE INVENTION

The present invention relates to a method for automatically producing and updating a data set for an autonomous vehicle; it also relates to an autonomous or partially autonomous vehicle which carries out such a method and is suitable for using the data collected with the aid of the method.

BACKGROUND INFORMATION

Highly precise maps are of essential importance for autonomous and partially autonomous vehicles. Information about the road and lane geography that is precise down to the centimeter is able to be called up by the vehicle and used for planning a trajectory for the autonomous vehicles and driver assistants. Moreover, so-called HAD (highly automated driving) maps include landmarks such as static 3D objects, road markings, guideposts, traffic signs and traffic lights. These are able to be detected by vehicle-internal sensors such as 3D laser scanners, video cameras and radar sensors, and allow for the highly precise locating of the vehicle within the map. In addition, the maps include information about connectivities of the traffic lanes such as possible turnoffs at intersections. Traffic lights, in particular, are able to be manually allocated to certain traffic lanes. In some instances, a number of systems of different vehicles transmit landmarks detected at different instants as well as trajectory data and GPS information to a vehicle-external server, where the data are utilized for preparing and updating maps. For example, this may be accomplished with the aid of a graph compensation method. However, no automated allocation of a traffic light to a certain traffic lane is possible in this case.

SUMMARY OF THE INVENTION

An object on which the present invention is based may be seen as providing a method for the automatic production and updating of a data set having a crowd-supported traffic light/traffic lane allocation, as well as an autonomous or partially autonomous vehicle for carrying out the present method and for using the data set.

This objective may be achieved by the respective subject matter described herein. Advantageous further developments of the present invention are the subject matter of the respective further descriptions herein.

According to one aspect of the present invention, a method is provided for the automatic production and updating of a data set for an autonomous vehicle. At least one traffic light and a switching state of the at least one traffic light are registered. In addition, at least one road marking is ascertained and a trajectory of at least one vehicle traveling ahead is registered. The collected data are used to produce and update the data set. According to the present invention, at least one traffic lane is allocated to at least one traffic light based on the at least one detected trajectory, the at least one switching state of the at least one traffic light and the at least one ascertained road marking.

A trajectory of at least one vehicle traveling ahead is registered by at least one sensor such as a camera or a LIDAR (light detection and ranging) sensor, and based on the ascertained switching states of the respective traffic lights and the traffic lanes defined by the recorded road markings, it is inferred whether the respective traffic lane is a turn-off lane, for example, or is intended for straight-ahead driving.

Thus, a directional function is able to be allocated to each traffic light and the corresponding traffic lanes in an automated manner without the need to detect a directional arrow on the road.

This is also possible if a directional marker on the road is missing or covered. The driving trajectory of vehicles driving ahead is observed and used for the allocation. For instance, if the switching state of a traffic light changes and a vehicle that exhibits a corresponding movement in terms of time (e.g., starting to drive and a turning operation) is ascertained in a traffic lane, then it may be determined through an evaluation of the data that the traffic light and the traffic lane involve a turn-off lane. In contrast to the current manual allocation, this makes it possible to set up HAD maps providing a large area coverage even for complex intersections in an efficient and automated manner. The method is especially able to be carried out by a single vehicle or multiple vehicles. With the aid of sensors, each vehicle may ascertain the described factors in the form of data. The collected data are used to produce and update a data set. The respective compatible vehicles are able to transmit this data set to a vehicle-external server unit. Since it is possible to predict a "green wave", during which multiple traffic lights are sequentially switched to green, the present method additionally allows for a rapid locomotion of one or more vehicle(s) in traffic. To do so, the vehicles need to know their own traffic lane, the current switching state and the switching cycle of the traffic lights and possibly the position of other vehicles. This makes it possible, for instance, to reduce the fuel consumption, to optimize or shorten the travel time and to increase the driving comfort in an automatic driving function. Utilizing the known switching cycle, the braking operation of vehicles driving ahead in the own traffic lane of a vehicle is able to be predicted in addition.

According to one exemplary embodiment of the present method, the measurements by different vehicles are carried out at different points in time and transmitted to an external server unit for evaluation. The data from different observations that stem from different vehicles and different points in time are able to be collected and jointly evaluated on the vehicle-external server unit. In the process, corresponding traffic lanes are able to be allocated to the respective traffic lights based on the information that indicates the traffic light phase or the switching state during which vehicles have passed through the intersection from which particular traffic lane.

According to one further exemplary embodiment of the present method, a switching cycle of at least one traffic light is detected and/or supplemented in the form of a data set based on the measurements by different vehicles at different times. Exploiting data that were recorded by a plurality of vehicles at different points in time makes it possible to detect the complete switching cycle of, for instance, at least one traffic light or the entire light signal system or traffic light system of an intersection. This is even possible when each individual vehicle has monitored the traffic light or the traffic light signal for only a brief period of time. The duration of the individual traffic light phases is also able to be detected. In addition, monitoring errors, wrong-way drivers, and drivers making wrong turns are able to be identified by the repeated measurements and discarded.

According to a further exemplary embodiment of the present method, a duration of at least one switching state of the at least one traffic light is ascertained using at least two vehicle-based measurements. Since a single vehicle is not always able to detect an entire switching cycle of a traffic light, it is advantageous if an entire switching cycle of one or a plurality of traffic light(s) is able to be determined based on the individually ascertained data from different vehicles. For instance, changes in the switching state of traffic lights may be used as shared time reference points when combining the data.

According to one further exemplary embodiment of the present method, switching states of at least two traffic light systems relative to one another along a travel route are detected and stored. In the process, cycle periods of the switching cycles or lengths of the individual traffic light phases, especially the green phase, and thus also the length of an entire switching cycle of traffic lights, are able to be detected with the aid of measurements by vehicles and transmitted to a vehicle-external server unit. More specifically, even the relative switching instants of a plurality of traffic lights with respect to one another along a travel route may be detected and stored. This makes it possible for an autonomous vehicle, for example, to utilize a detected "green wave" to pass through a plurality of linked traffic light systems in a manner that is optimized in terms of time.

According to one further exemplary embodiment of the present method, the ascertained data from at least two vehicles are collected on the external server unit and processed in order to form a model of traffic light systems and their mutual dependencies. The ascertained data of all involved vehicles may be collected on the server unit and a model of all traffic lights and the mutual dependencies of the traffic lights are able to be ascertained. The server unit distributes the traffic light model to the data-acquiring vehicles again and, optionally, also to passively involved vehicles. A driving schedule of other autonomous or partially autonomous vehicles may thus be optimized as well. For example, an initial acceleration or stop behavior of the vehicles in front of a traffic light or a speed profile between two traffic lights is able to be adapted so that, for example, a total driving time and/or a fuel consumption of the vehicle may be minimized. Such a model is able to be used for a future prediction of a total driving time of a travel route, for example.

According to one further exemplary embodiment of the present method, the model and the at least one acquired data set are automatically stored in a vehicle-external HAD map or are used to correct a vehicle-external HAD map. The first produced model or a plurality of models of traffic lights or entire traffic light systems as well as the ascertained data may be stored in a map in the form of a data set or be used for updating or correcting the map that is suitable for what is known as 'highly automated driving'. Autonomous or partially autonomous vehicles are therefore able to access the HAD map and automatically navigate along a route. Because of the traffic light model and the always updated data sets, such a vehicle is able to navigate along defined routes without interruption and optimally and automatically consider traffic light phases during the navigation.

According to another exemplary embodiment of the present method, the allocation of the at least one traffic lane to the at least one traffic light takes place in the external server unit or in a vehicle. Modern vehicles are equipped with diverse control devices and processing units. Autonomous or partially autonomous vehicles, in particular, have to have powerful processing capabilities in order to evaluate the sensors and to control the vehicles. The already available processing units are able to assume or preprocess the allocation of the traffic lanes or the directional information to corresponding traffic lights and traffic light phases. This makes it possible to reduce the computational work of the external server unit. Hence, a faster server unit is realizable, which is able to respond to queries of vehicles or to arriving data sets in a more dynamic or rapid manner. Alternatively, the external server unit may perform the allocation of traffic lanes since a stationary processing unit may usually have a higher processing power and greater storage capacities. For the transmission of the relevant data, both the vehicles and the external server unit may include communications devices which are capable of a mutual bidirectional communication and data exchange.

According to one further aspect of the present invention, an autonomous or partially autonomous vehicle is provided for carrying out the method according to the previous aspect of the present invention. The vehicle includes at least one sensor for detecting road markings, for detecting vehicles driving ahead and their trajectories, and for detecting traffic lights and switching states of the traffic lights. In addition, the vehicle has at least one communications device for transmitting the acquired data and for receiving the collected and processed data sets from an external server unit.

For example, at least one sensor installed in the vehicle such as a camera or a LIDAR sensor may be used to detect road markings, vehicles driving ahead and traffic lights. In addition, the vehicle trajectories and the switching states of the traffic lights are able to be detected. Based on the interplay between the vehicle trajectories and the switching states of the traffic lights, the vehicles driving ahead are able to be allocated to certain traffic lanes. Directional functions, in particular, may thereby be allocated to different traffic lanes. The communications device transmits these data to at least one vehicle-external server unit. The server unit collects and jointly evaluates these data sets from multiple observations originating from different vehicles and different instants. For this purpose, using the ascertained information relating to the traffic light phase during which vehicles have passed through the intersection and from which particular traffic lane, the traffic lights are allocated to the traffic lanes, and corresponding traffic light models are prepared. Utilizing the data sets that were recorded by a plurality of vehicles at different points in time makes it possible to detect a complete switching cycle of the traffic light system even if each vehicle has kept track only for a brief period of time. In addition, monitoring errors, wrong-way drivers or drivers making a wrong turn are able to be detected by the repeated measurements and not taken into account.

According to one exemplary embodiment, a vehicle-external HAD map may be used for navigation purposes for the vehicle. This gives the vehicle access to the vehicle-external HAD map stored on the server unit so that it is able to utilize the map for the navigation. Alternatively or additionally, the vehicle may also intermittently buffer the map or cache it and call it up from a vehicle-internal processing unit.

According to one further exemplary embodiment, the traffic light positions and the ascertained data sets pertaining to traffic lights are projectable from the HAD map into a vehicle-internal image-coordinate system of at least one vehicle-internal camera. For example, respective positions of traffic lights are able to be transmitted from the HAD map to a vehicle-internal sensor system and database and visualized in the camera image, provided a display unit is available. A detection accuracy and range of a traffic-light detection algorithm, in particular, are able to be increased by the projection. This improves the time schedule horizon and also the robustness of an automatic driving function, and thus allows for an optimization of the driving comfort, safety and fuel consumption.

In the following text, preferred exemplary embodiments of the present invention are described in greater detail on the basis of greatly simplified schematic illustrations.

In the figures, each of the same constructive elements have been provided with the same reference numeral.

DETAILED DESCRIPTION

Figure 1:
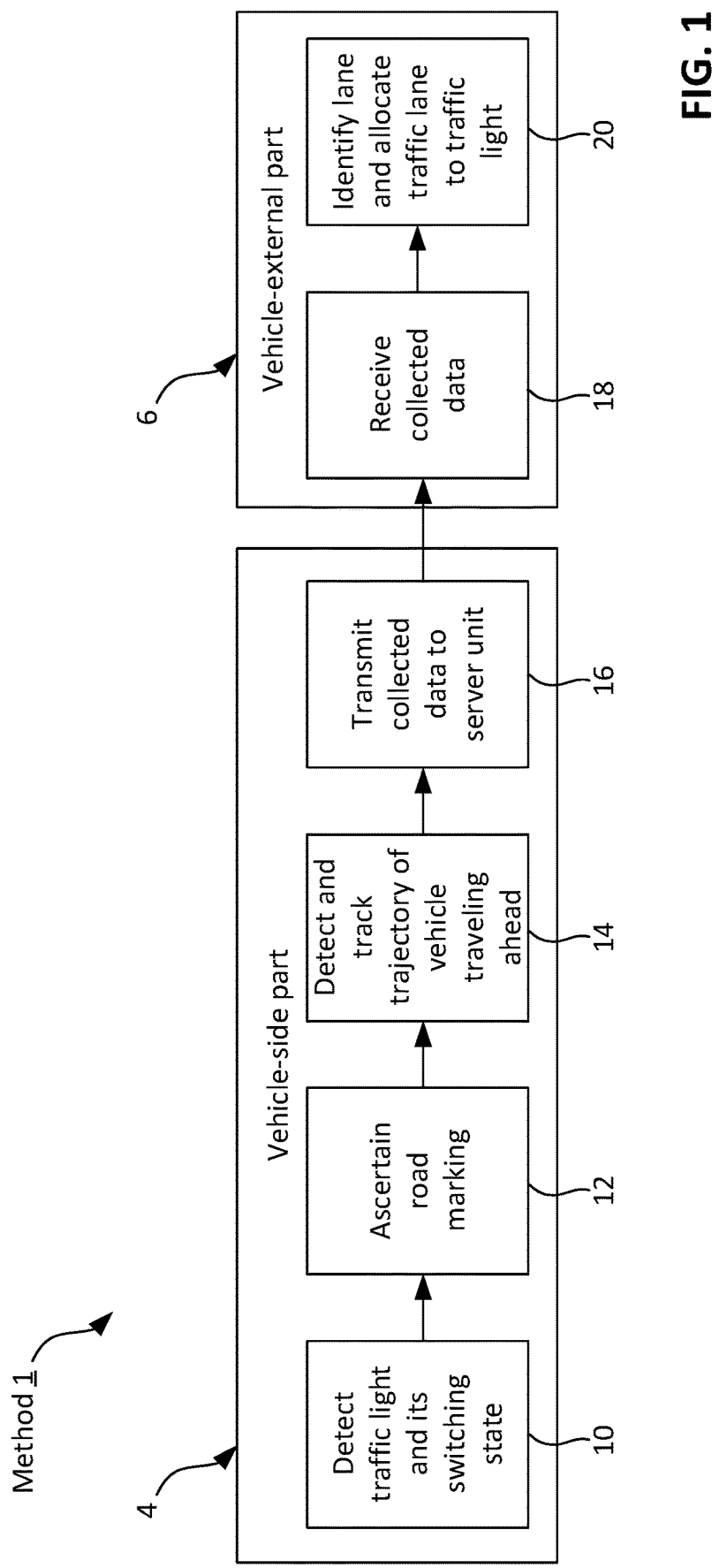
FIG. 1 shows a schematized illustration of a method for the automatic production and updating of a data set for an autonomous vehicle according to a first exemplary embodiment.

FIG. 1 shows a schematic illustration of a method 1 for the automatic production and updating of a data set for an autonomous vehicle 2 according to a first exemplary embodiment. Method 1 has a vehicle-side part 4 and a vehicle-external part 6. Vehicle-side part 4 of method 1 is carried out by a vehicle 2 equipped with a corresponding sensor system and processing unit. Vehicle-external part 6 of method 1 is carried out by an external server unit.

In method 1, at least one traffic light and one switching state of the at least one traffic light is detected 10 by a vehicle-side sensor system in a first step. In a further step, at least one road marking is ascertained 12. A vehicle trajectory of at least one vehicle traveling ahead is then detected and tracked 14. The collected data are used for producing and updating a vehicle-external data set. Toward this end, the collected data are transmitted 16 to a vehicle-external server unit. The mentioned steps are able to be carried out in parallel or one after the other.

Vehicle-external server unit 28 receives collected data 18. Based on the at least one switching state of the at least one traffic light 34, the at least one ascertained road marking 36, and the at least one detected trajectory of a vehicle 40 driving ahead, at least one traffic lane 38 is identified and allocated 20 to at least one traffic light 34. The allocation makes it possible to allocate a directional function to traffic lane 38, which following autonomous or partially autonomous vehicles 2 are able to use in order to optimally navigate in the vicinity of traffic lights.

Figure 2:
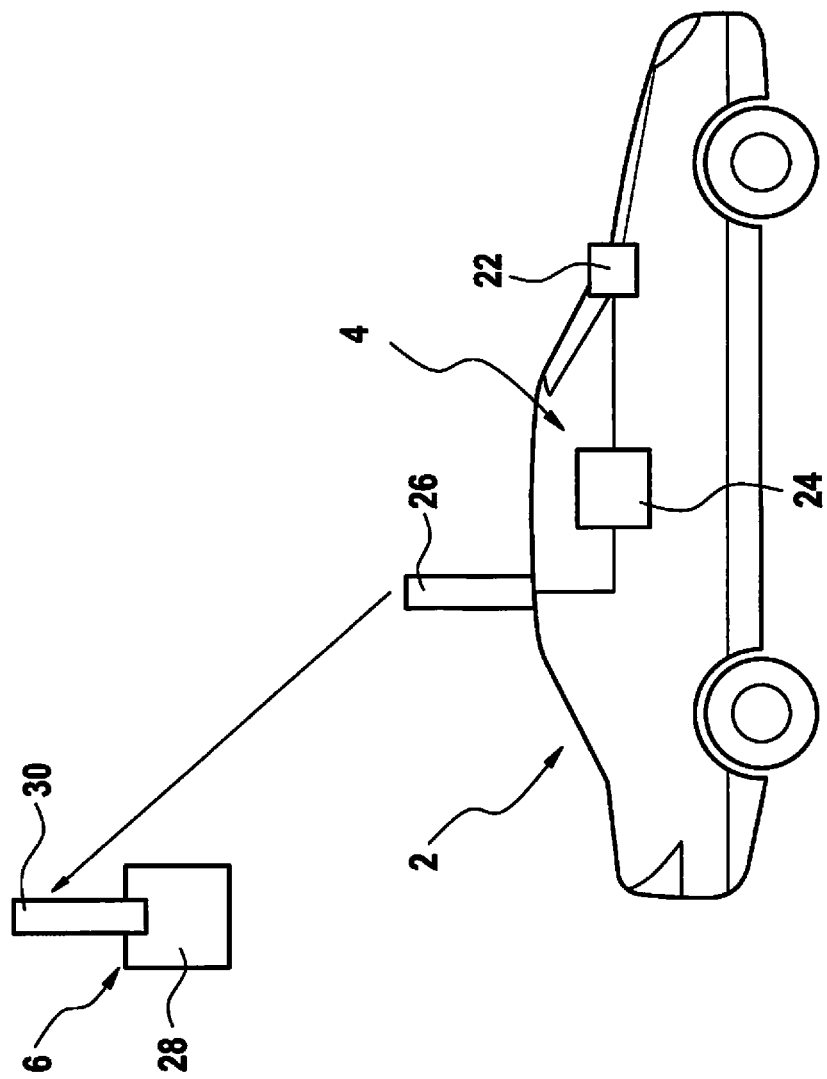
FIG. 2 shows a schematized illustration of a vehicle according to a first exemplary embodiment.

A schematic illustration of a vehicle 2 according to a first exemplary embodiment is shown in FIG. 2. Vehicle 2 is developed to carry out the vehicle-side part 4 of method 1 for the automatic production and updating of a vehicle-external data set. Vehicle 2 has a camera 22, which is mounted on a front side of vehicle 2. Camera 22 records an environment of vehicle 2 and forwards the generated images to a vehicle-side processing unit 24. Processing unit 24 evaluates the generated images and ascertains road markings, registers vehicles driving ahead, and tracks the trajectory or driving directions of vehicles 40 traveling ahead on the basis of the images. In addition, processing unit 24 detects traffic lights and their switching states by analyzing the images. The ascertained and analyzed information is able to be transmitted in a continuous manner or packet by packet via a communications device 26 to a vehicle-external server unit 28. For this purpose, server unit 28 is also equipped with a vehicle-external communications device 30, which is used for receiving ascertained data and for transmitting evaluated or requested data.

Figure 3:
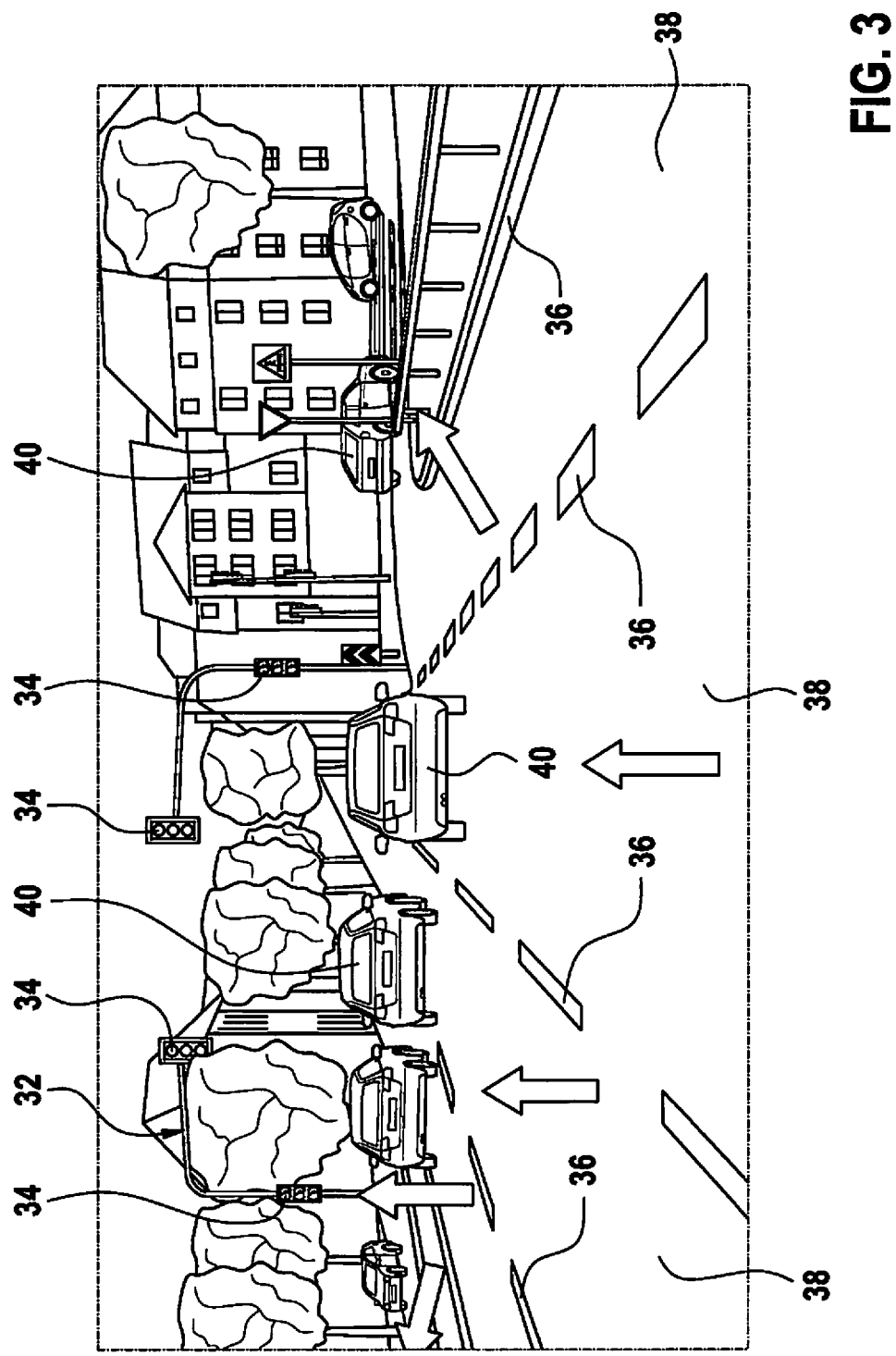
FIG. 3 shows a traffic light system in which the method according to the first exemplary embodiment is executed by way of example.

FIG. 3 shows a traffic light system 32, for which method 1 according to the first exemplary embodiment is used by way of example. More specifically, an image is shown which was recorded by camera 22 of vehicle 2. Processing unit 24 has already detected traffic lights 34 of traffic light system 32. In addition, road markings 36 were detected by processing unit 24. Road markings 36 are therefore used for detecting traffic lanes 38 in the image. Moreover, processing unit 24 has detected vehicles 40 driving ahead. With each further image, vehicles 40 driving ahead are detected and in particular their rate of movement and direction are detected. Based on the movement starting from the respective traffic lanes 38 and the switching states of traffic lights 34, it is therefore possible to ascertain directional information. The arrows in traffic lanes 38 illustrate the directional information. Based on the image, it may particularly be ascertained that vehicle 40 traveling ahead in the right traffic lane makes a right turn and that this traffic lane 38 is therefore most likely a traffic lane 38 provided for a right turn. This information is now able to be evaluated and corrected with the aid of further data from other vehicles 2. Based on the vehicle trajectories of vehicles 40 driving ahead in the three center lanes 38, straight-ahead driving is able to be allocated to traffic lanes 38 in each case.

What is claimed is:

1. A method for an autonomous vehicle, the method comprising:
   the autonomous vehicle using a sensor system of the autonomous vehicle to obtain sensor signals;
   based on the sensor signals, a processor of the autonomous vehicle:
   identifying at least one traffic light and a respective switching state of each of the identified at least one traffic light;
   ascertaining at least one road marking; and
   detecting a respective trajectory of at least one vehicle traveling spatially ahead of the autonomous vehicle, wherein, based on the detected trajectory of the at least one vehicle traveling spatially ahead, the respective switching state of the each of the identified at least one traffic light, and the at least one ascertained road marking, at least one traffic lane k identified as being allocated to the identified at least one traffic light; and
   the processor of the autonomous vehicle performing an autonomous control of the autonomous vehicle according to a determination of which light signals of the at least one traffic light apply to the autonomous vehicle based on the identified allocation of the at least one traffic lane to the identified at least one traffic light.

2. The method of claim 1, wherein the allocation is performed by an external server unit based on data that, at different points in time, are obtained by different vehicles and transmitted to the external server unit for evaluation.

3. The method of claim 1, wherein a switching cycle of the at least one traffic light is detected through the measurements obtained by different vehicles at different points in time.

4. The method of claim 1, wherein a duration of at least one switching state of the at least one traffic light is ascertained using at least two vehicle-based measurements.

5. The method of claim 1, wherein switching states of at least two traffic light systems relative to one another along a driving route are detected and stored.

6. The method of claim 1, wherein the ascertained data from at least two vehicles are collected on an external server unit and processed to form a model of traffic light systems and their mutual dependencies.

7. The method of claim 6, wherein the model and the collected data are automatically stored in a vehicle-external highly automated driving (HAD) map or are used to correct a vehicle-external HAD map.

8. The method of claim 1, wherein the takes place in the autonomous vehicle.

9. An autonomous or partially autonomous vehicle, comprising: at least one sensor; and
a control unit, wherein the control unit is configured to:
use the at least one sensor to obtain sensor signals;
based on the sensor signals: identify at least one traffic light and a respective switching state of each of the identified at least one traffic light;
ascertain at least one road marking; and
detect a respective trajectory of at least one vehicle traveling spatially ahead of the autonomous vehicle, wherein, based on the detected trajectory of the at least one vehicle traveling spatially ahead, the respective switching state of the each of the identified at least one traffic light, and the at least one ascertained road marking, at least one traffic lane is identified as being allocated to the identified at least one traffic light; and
perform an autonomous control of the autonomous vehicle according to a determination of which light signals of the at least one traffic light apply to the autonomous vehicle based on the identified allocation of the at least one traffic lane to the identified at least one traffic light.

10. The vehicle of claim 9, wherein a vehicle-external highly automated driving (HAD) map is use-able for the autonomous vehicle for navigation purposes, the HAD map being updated based on the allocation.

11. The vehicle of claim 10, wherein traffic light positions and ascertained data sets pertaining to traffic lights are projectable from the vehicle-external highly automated driving (HAD) map into a vehicle-internal image-coordinate system of at least one vehicle-internal camera.

* * * * *